United States Patent
Ben-Shalom et al.

(10) Patent No.: US 9,680,849 B2
(45) Date of Patent: *Jun. 13, 2017

(54) ROOTKIT DETECTION BY USING HARDWARE RESOURCES TO DETECT INCONSISTENCIES IN NETWORK TRAFFIC

(71) Applicant: McAfee, Inc., Santa Clara, CA (US)

(72) Inventors: Omer Ben-Shalom, Rishon Le-Tzion (IL); Alex Nayshtut, Gan Yavne (IL); Igor Muttik, Berkhamsted (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,058

(22) Filed: Nov. 2, 2015

(65) Prior Publication Data

US 2016/0173512 A1    Jun. 16, 2016

Related U.S. Application Data

(63) Continuation of application No. 13/931,705, filed on Jun. 28, 2013, now Pat. No. 9,197,654.

(51) Int. Cl.
*H04L 29/00* (2006.01)
*H04L 29/06* (2006.01)
*G06F 21/55* (2013.01)
*G06F 21/50* (2013.01)

(52) U.S. Cl.
CPC ......... *H04L 63/1416* (2013.01); *G06F 21/55* (2013.01); *G06F 21/552* (2013.01); *G06F 21/554* (2013.01); *G06F 21/556* (2013.01); *H04L 63/0227* (2013.01); *H04L 63/12* (2013.01); *H04L 63/14* (2013.01); *H04L 63/145* (2013.01); *H04L 63/1408* (2013.01); *H04L 63/1425* (2013.01); *G06F 21/50* (2013.01); *H04L 63/16* (2013.01)

(58) Field of Classification Search
CPC .......... G06F 21/05; H04L 63/02; H04L 63/14
See application file for complete search history.

(56) References Cited

U.S. PATENT DOCUMENTS

| | | | | |
|---|---|---|---|---|
| 7,665,136 | B1 * | 2/2010 | Szor | G06F 21/566 709/220 |
| 8,079,030 | B1 * | 12/2011 | Satish | H04L 63/14 713/164 |
| 8,443,449 | B1 * | 5/2013 | Fan | G06F 21/564 713/188 |
| 8,549,648 | B2 * | 10/2013 | Sallam | G06F 21/554 726/24 |
| 2007/0079178 | A1 * | 4/2007 | Gassoway | G06F 21/566 714/38.14 |
| 2008/0183996 | A1 * | 7/2008 | Field | G06F 9/468 711/163 |
| 2012/0255011 | A1 * | 10/2012 | Sallam | G06F 21/564 726/24 |
| 2013/0247182 | A1 * | 9/2013 | Levites | G06F 21/55 726/22 |

* cited by examiner

*Primary Examiner* — Madhuri Herzog
(74) *Attorney, Agent, or Firm* — Blank Rome, LLP

(57) ABSTRACT

A technique allows detection of covert malware that attempts to hide network traffic. By monitoring network traffic both in a secure trusted environment and in an operating system environment, then comparing the monitor data, attempts to hide network traffic can be detected, allowing the possibility of performing rehabilitative actions on the computer system to locate and remove the malware hiding the network traffic.

24 Claims, 6 Drawing Sheets

| SOURCE IP | DESTINATION IP | SOURCE PORT | DESTINATION PORT | PROTOCOL | BYTES | PACKETS |
|---|---|---|---|---|---|---|
| 10.1.2.4 | 10.234.23.14 | 23452 | 911 | 17 | 623 | 3 |
| 10.234.23.14 | 10.1.2.4 | 911 | 23452 | 17 | 7238 | 8 |
| 10.1.2.4 | 10.4.23.12 | 23453 | 8723 | 9 | 79 | 1 |
| 10.1.2.4 | 10.9.65.3 | 23454 | 8823 | 9 | 187 | 1 |

200, 210 (rows 1-2), 220 (rows 3-4)

| SOURCE IP | DESTINATION IP | SOURCE PORT | DESTINATION PORT | PROTOCOL | BYTES | PACKETS |
|---|---|---|---|---|---|---|
| 10.1.2.4 | 10.4.23.12 | 23453 | 8723 | 9 | 79 | 1 |
| 10.1.2.4 | 10.9.65.3 | 23454 | 8823 | 9 | 187 | 1 |

ROOTKIT DETECTION BY USING HARDWARE RESOURCES TO DETECT INCONSISTENCIES IN NETWORK TRAFFIC

TECHNICAL FIELD

Embodiments described herein generally relate to malware detection, and in particular to detection of malware that attempts to hide network traffic from anti-malware software.

BACKGROUND ART

Rootkits are a stealthy type of malicious software (malware) designed to hide the existence of certain processes or programs from normal methods of detection. Rootkits typically enable continued privileged access to the compromised system. Rootkit installation may be either automated or activated when an attacker obtains root or Administrator access. Obtaining this access is either a result of direct attack on a system, exploiting a known vulnerability, or by getting access to a password (by cracking, privilege escalation, or social engineering). Once installed a rootkit typically attempts to hide the intrusion as well as to maintain privileged access for itself (or other processes).

Rootkit detection is difficult because a rootkit may be able to subvert the software that is intended to find it. Detection methods include using an alternative, trusted operating system, behavioral-based methods, signature scanning, difference scanning, and memory dump analysis. Removal can be complicated or practically impossible, especially in cases where the rootkit resides in the kernel. Reinstallation of the operating system may be the only available solution to the problem. When dealing with firmware rootkits, removal may require hardware replacement, or specialized equipment.

Modern rootkits do not necessarily elevate access, but are often used to make another software payload undetectable by adding stealth capabilities. Most rootkits are classified as malware, because the payloads they are bundled with are malicious. For example, a payload might covertly steal user passwords, credit card information, computing resources, or conduct other unauthorized activities. A small number of rootkits may be considered utility applications by their users: for example, a rootkit might cloak a CD-ROM-emulation driver, allowing video game users to defeat anti-piracy measures that require insertion of the original installation media into a physical optical drive to verify that the software was legitimately purchased.

Rootkits can run at different privilege levels or modes of a computer environment. User-mode rootkits run at the same mode as most other user applications, rather than low-level system processes. They have a number of possible installation vectors to intercept and modify the standard behavior of application programming interfaces (APIs). Some inject a dynamically linked library (such as a .DLL file, .dylib file, a .so file, or a .shlib file) into other processes, and are thereby able to execute inside any target process to spoof it. Others with sufficient privileges simply overwrite the memory of a target application.

Kernel-mode rootkits (ring 0) and/or rootkits residing in virtualization layer (sometimes referred to as ring −1) run with the highest operating system privileges by adding code or replacing portions of the core operating system, including both the kernel and associated device drivers. Most operating systems support kernel-mode device drivers, which execute with the same privileges as the operating system itself. As such, many kernel-mode rootkits are developed as device drivers or loadable modules, such as loadable kernel modules or device drivers. This class of rootkit has unrestricted security access. Kernel rootkits can be especially difficult to detect and remove because they operate at the same security level as the operating system itself, and are thus able to intercept or subvert the most trusted operating system operations and thereby "hide" themselves in a stealth-like manner. Rootkits and other malware that hide their existence on a system are difficult to detect and clean from within the scope of the infected operating environment.

BRIEF DESCRIPTION OF DRAWINGS

FIG. 2 is a chart illustrating differences between network traffic monitored in a secure environment and an insecure environment according to one embodiment.

DESCRIPTION OF EMBODIMENTS

Figure 1:
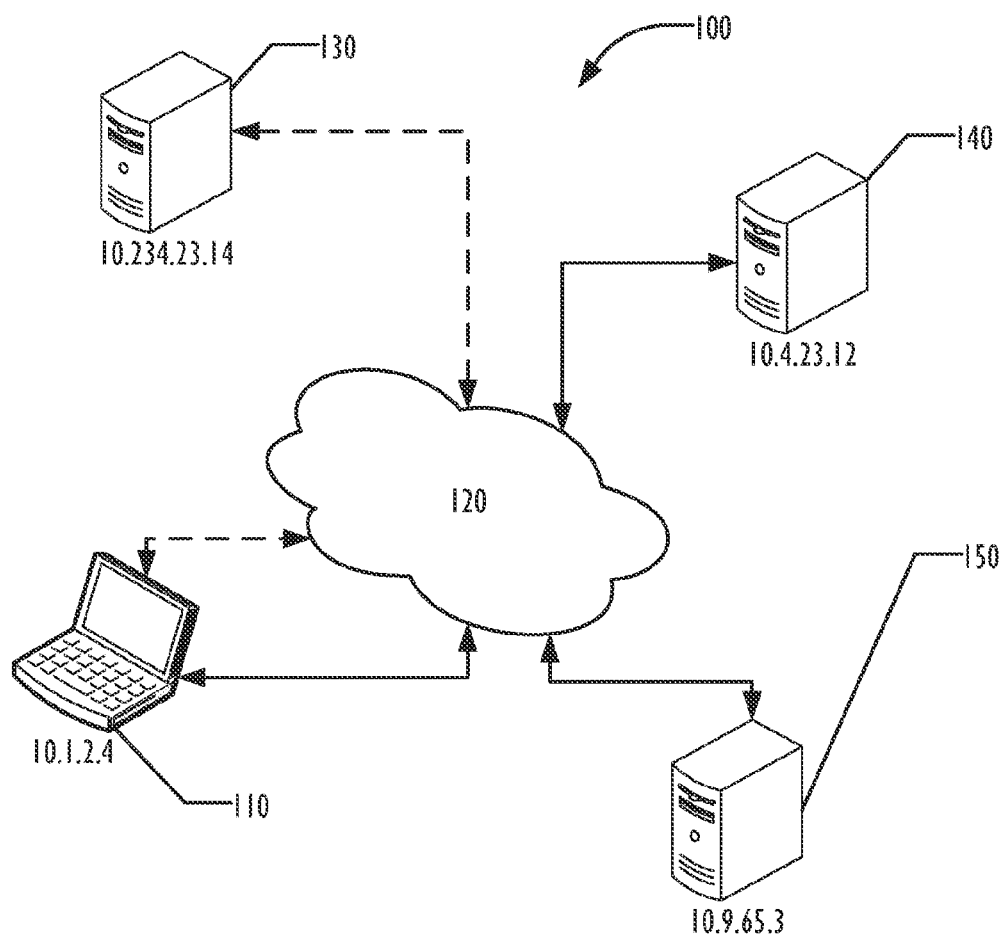
FIG. 1 is a block diagram illustrating a network of computers with hidden network traffic according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "a computer system" can refer to a single computer or a plurality of computers working together to perform the function described as being performed on or by a computer system.

Increasingly, cyber-attacks on businesses, government agencies, and others are covert and persistent. As a result, the ability to detect covert communications becomes increasingly more important to being able to deal with threats to intellectual property and personal information theft.

A main element in covering one's tracks involves hiding from software resident in the operating system. A common method of avoiding detection is using malware that is able to hide activities from software such as anti-virus and host based intrusion detection. Contemporary threats pay more attention to hiding inside the operating system (rootkits and bootkits) but covert network transmissions are a natural next step, thus detecting malware communications is becoming increasingly relevant and valuable. Bootkits (rootkits that activate before operating system initiation during the boot process) can control the operating system's interaction with the network hardware. They can also manipulate the networking stack, typically an Internet Protocol (IP) stack. This would render the operating system and software operating under the operating system (including intrusion detection or other security software) incapable of seeing the malicious network traffic. Rootkit code may also activate from firmware which would make it harder to detect and significantly harder to remove.

There are multiple rootkit detection programs in the market, employing different methods. The methods of comparing trusted and potentially tainted information are well known and have been used in many anti-rootkit tools such as the use of Difference-based detection by Russinovich's RootkitRevealer, which enabled detection of the Sony DRM rootkit. Other examples are F-Secure's Blacklight and McAfee's RootkitDetective, all of which use differential viewing as one of the main detection methods. However, the existing anti-rootkit solutions do not consider network traffic, and rootkit or bootkit tools to hide network traffic would be difficult, if not impossible, to detect using purely software-based difference-based detection.

Recognition of the value of detecting hidden network traffic and the problem of detecting such traffic led to solutions that are disclosed below. The following are a few examples showing the importance of this invention in a world of covert, persistent threats.

Consider a malware loaded via whatever method (for example, a drive-by in a web site). The malware is designed to collect information and to exfiltrate the collected information periodically to an external entity. Because intrusion detection systems, which may be host-based or network-based, might flag that activity as suspicious, malware designers try to prevent the intrusion detection agents from detecting the exfiltration. To avoid network based logging and intrusion detection systems, the malware may be designed to send information only when no proxy is used or when connected to a known private IP address (e.g., 192.168.X.X). Even if the external entity is currently unknown and not blacklisted as malicious by intrusion detection systems, the external entity may become known later. To stay covert, malware designers may attempt to keep the network traffic for the communication with the external entity undetected by host-based intrusion detection systems using rootkits or bootkits. This creates an inconsistency of network records between what is actually sent and received and what operating system environment software may record as being sent and received, thus restricting what host-based intrusion detection systems may detect. That hole provides an opportunity for a solution to the problem of hidden network traffic.

In another example, a dormant agent hits on a command and control (C&C) system every so often. That system may become a known C&C system and detecting communication with the C&C system can give away the existence of the malware. The reasonable thing for the malware to do is to keep this contact with the C&C system hidden. But that produces an inconsistency between the actual network traffic and what network traffic monitors in the operating system environment can detect, and offer another opportunity for a solution.

Solutions described herein aim to catch the network traffic that tries to stay hidden. These are normally the things that are the most important to try to detect, because things that hide generally have a reason to hide. By using a trusted environment, typically built into the hardware of the computer system, to monitor network traffic, in addition to using software in an operating system environment and comparing the network traffic records, hidden network traffic can be detected without the need to use external network monitors. The network traffic records produced in the trusted environment are compared to the network records produced in the operating system environment, with differences generally indicating the presence of hidden network traffic.

Components of the solutions may include operating system-based software, such as a host-based intrusion detection system, hardware monitors, and a comparison facility. In addition, once detection has occurred, the system may be able to act on alerts generated by the comparison facility to try to take remedial action. These components are described in more detail below.

No existing anti-rootkit solution performs differential viewing of network traffic, and no existing detection technique uses secure environment-authored data.

FIG. 1 is a block diagram illustrating network traffic that can be detected by the techniques described below. In this example, computer 110 is communicating with computers 130, 140, and 150 through network 120, but the traffic between the computer 110 and computer 130 is being hidden by a root kit or boot kit installed on the computer 110, as indicated by the dashed lines connecting them. The IP addresses associated with each of the computers 110, 130, 140, and 150 are arbitrary example IP addresses for use with the chart of FIG. 2. Conventional anti-malware host-based intrusion detection systems, even if they were checking network traffic, would not detect the hidden communication between computer 110 and the computer 130. Although as illustrated in FIG. 1 computer 110 is a laptop computer and computers 130, 140, and 150 are server computers, any types of network-connected or connectable computers or processor-based systems, including systems embedded in mobile devices or non-computing equipment, may generate network traffic, some of which may be hidden by malware. Any such device that offers a trusted execution environment may implement the techniques described below. Network 120 may be any type of network, including local area networks and wide area networks, switched and un-switched, as well as point-to-point communication, employing wired or wireless transport of network traffic. Although a single network 120 is illustrated in FIG. 1 for clarity, network 120 may be and typically is implemented as multiple interconnected networks, such as the Internet, some of which may be private networks and some of which may be public networks.

Turning to FIG. 2, two charts 200 and 250 illustrate the difference between what a secure environment would see as network traffic for computer 110 and what a host-based intrusion detection system would see. The contents of charts 200 and 250 are illustrative and by way of example only. In chart 200, rows 210 indicate network traffic between computer 110 (identified by its example IP address of 10.1.2.4)

and computer 130 (identified by its example IP address of 10.234.23.14). Similarly, rows 220 indicate network traffic between computer 110 and computer 140 (identified by its example IP address of 10.4.23.12) and between computer 110 and computer 150 (identified by its example IP address of 10.9.65.3).

As illustrated in rows 210 of the chart of FIG. 2, computer 110 has sent 3 packets to computer 130 from port 23452 on computer 110 to port 911 on computer 130. The packets were sent using protocol 17 (User Datagram Protocol (UDP)) and carried 623 bytes of data. Computer 130 has sent 8 UDP packets to computer 110 from port 911 on computer 130 to port 23452, carrying 7238 bytes of data.

As illustrated in rows 220 of the chart of FIG. 2, computer 110 has sent 1 Interior Gateway Protocol (IGP) (protocol 9) packet carrying 79 bytes of data from port 23,453 of computer 110 to port 8723 of computer 140. Similarly, computer has sent 1 IGP packet carrying 187 bytes of data from port 23,453 of computer 110 to port 8823 of computer 150.

Because this network traffic is monitored and recorded by a secure environment, the network traffic illustrated in rows 210 is not hidden from the secure environment. However, as shown in chart 250, the traffic is hidden to the host-based intrusion detection system that also monitors and records network traffic.

As illustrated in chart 250, rows 260 are identical to rows 220 of chart 200; however, there is no counterpart to rows 210 of chart 200, because malware in computer 110 hid that network traffic from the host-based intrusion detection system that captured the data of chart 250.

That difference is exploitable to allow detection of the malware. If there were no malware hiding network traffic, for whatever reason the malware deemed such hiding to be advisable, charts 200 and 250 should be identical. Therefore, the existence of a difference indicates that malware exists on computer 110. Although the difference does not indicate the nature of the malware—other than that it hides certain network traffic—the knowledge of the existence of malware that hides network traffic is a first step in solving the problem and removing the malware.

The format and data contained in charts 200 and 250 are illustrative and by way of example only, as is the network traffic illustrated by those charts. Any desired technique can be used for monitoring and recording network traffic. Although the examples used in this disclosure are based on IP protocol network traffic, the techniques described herein can be used for any type of network traffic, regardless of protocol.

One widely used technique for collecting and reporting IP traffic information is the NetFlow protocol, developed originally by Cisco Systems, with the most recent version published as RFC 3954, and standardized by the Internet Engineering Task Force as the IP Flow Information Flow Export (IPFIX) protocol. IPFIX is described in detail in RFCs 5101, 5102, and 5103. Basically, a flow or netflow is any number of packets observed during an observation period that share a number of properties, for example, the same source, the same destination, and the same IP protocol. These packets can be aggregated into a flow record or message by a metering process, then an exporter process sends the aggregate information to a collector. The collector may be on a different computer than the metering process and exporter. The sample data in FIG. 2 is illustrated in a simplified format that only shows particular key information fields useful for the malware detection technique. Actual implementations of the techniques described herein may use any desired format and storage technique for recording flow information, and may include other information, for example timestamps or any other fields defined in either the NetFlow or IPFIX protocols, or any other combination of fields that may be desired by the implementer.

Figure 3:
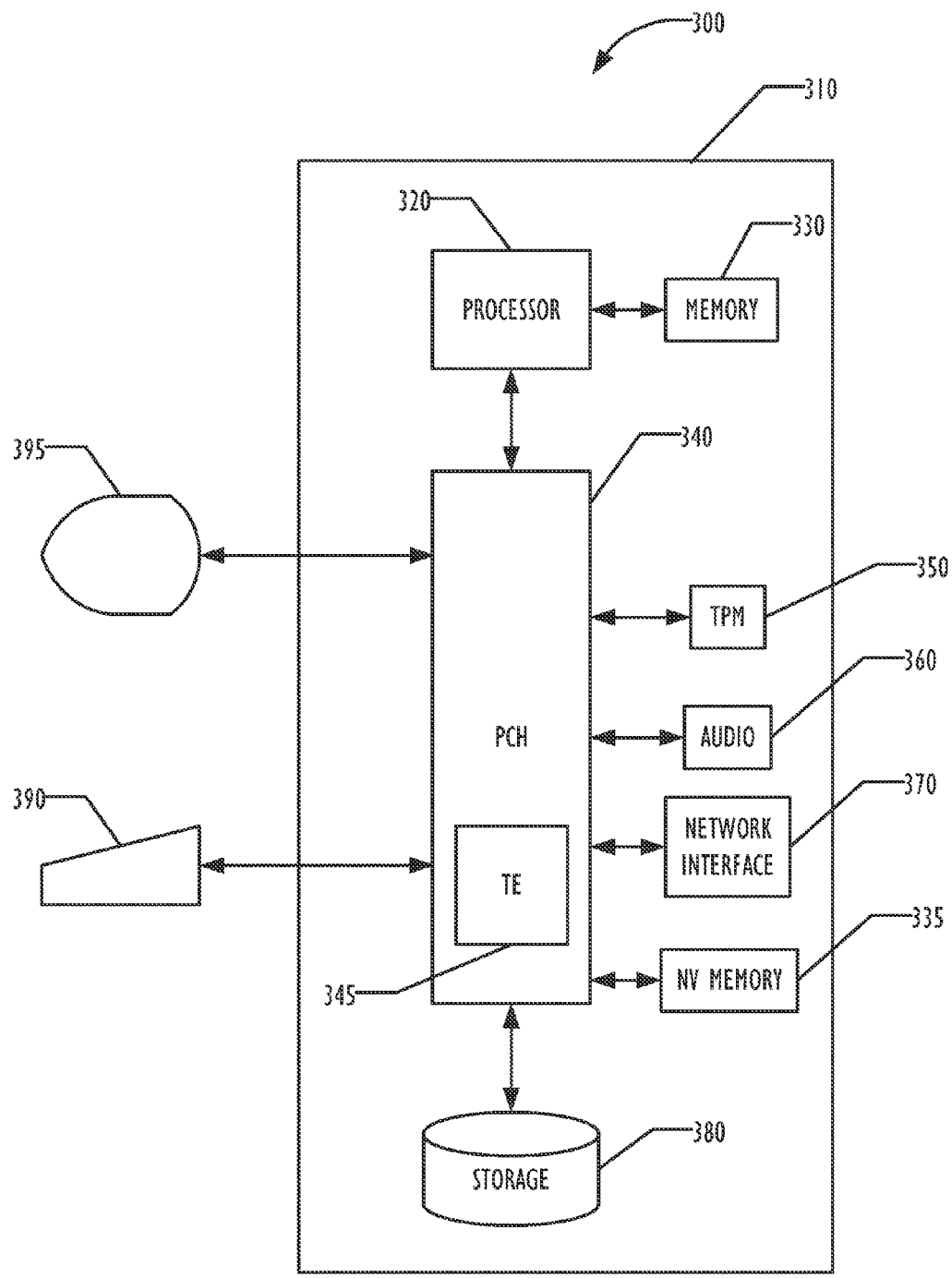
FIG. 3 is a block diagram illustrating a computer system for detecting rootkits according to one embodiment.

FIG. 3 is a block diagram illustrating a computer system 300 that may be used to implement some or all of the techniques described herein. A system unit 310 provides a location where components of the computer system 300 may be mounted or otherwise disposed. The system unit 310 may be manufactured as a motherboard on which various chipsets are mounted, providing electrical connection between the components and signal and power distribution throughout the system unit 310 and external to the system unit 310 as desired. For example, the computer system 300 may include an output device such as display 395, which provides a way to display alerts or other indications that the anti-malware system has detected the possibility of malware by examining the network traffic.

Figure 4:
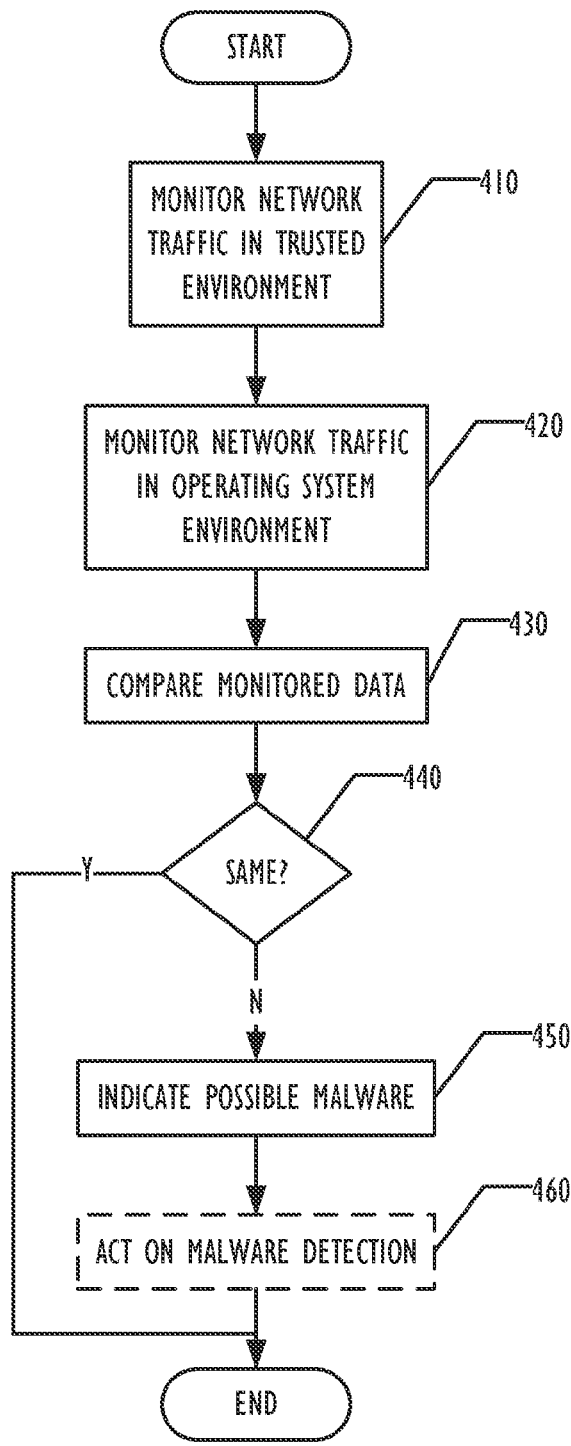
FIG. 4 is a flowchart illustrating a technique for detecting malware according to one embodiment.
Figure 5:
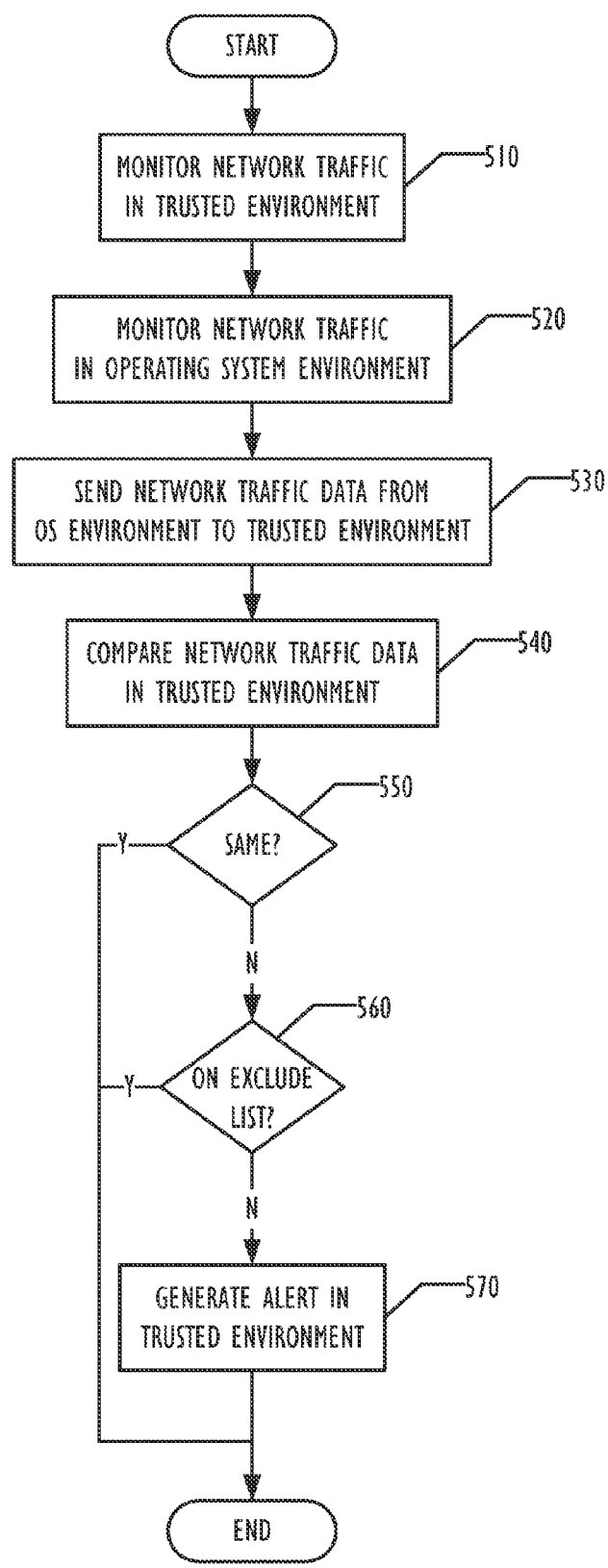
FIG. 5 is a flowchart illustrating a technique for detecting malware according to another embodiment.
Figure 6:
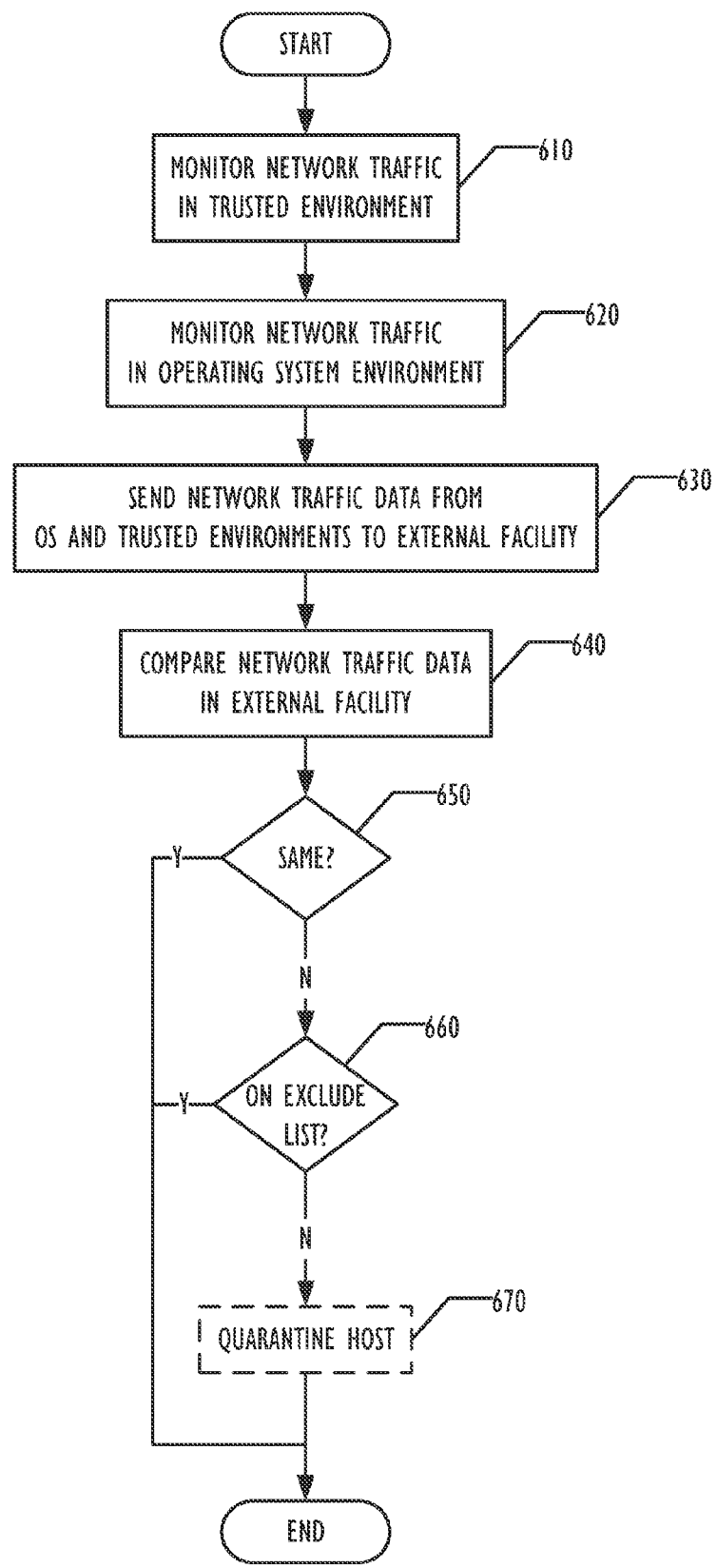
FIG. 6 is a flowchart illustrating a technique for detecting malware according to yet another embodiment.

Various components of the system unit 310 may include one or more processor 320, typically each a single processor chip mounted in a mounting socket (not shown in FIG. 3) to provide electrical connectivity between the processors 320 and other components of the computer 300. Although a single processor 320 is illustrated in FIG. 3, any desired number of processors can be used, each of which may be a multi-core processor. Multiple processor chips are available on the market currently, and any desired processor chip or chipset may be used. The system unit 310 may be programmed to perform methods in accordance with this disclosure, examples of which are illustrated in FIGS. 4-6.

The processor 320 is connected to memory 330 for use by the processor 320, typically using a link for signal transport that may be a bus or any other type of interconnect, including point-to-point interconnects. Memory 330 may include one or more memory modules and comprise random access memory (RAM), read only memory (ROM), programmable read only memory (PROM), programmable read-write memory, and solid-state memory. The processor 320 may also include internal memory, such as cache memory. An operating system running on the processor 320 generally controls the operation of the computer system 300, providing an operating system environment for services, applications, and other software to execute on the computer 300.

As illustrated in FIG. 3, processor 320 is also connected to a I/O subsystem 340 that provides I/O, timer, and other useful capabilities for the computer system 300. For example, the I/O subsystem 340 may provide I/O ports for connecting an optional display 395 and an optional input device 390, such as a keyboard, mouse, touch screen, to the system unit 310. The ports may be either one or more of special-purpose ports for components like the display 395 or multipurpose ports such as Universal Serial Bus (USB) ports for connecting a keyboard or mouse 390. The I/O subsystem 340 may also an interface for communicating with storage devices such as storage device 380, connect to audio devices through an audio interface 360, and connect to the network 120 via network interface 370. The storage device 380 represents any form of non-volatile storage including, but not limited to, all forms of optical and magnetic, including solid-state storage elements, including removable media, and may be included within system unit 310 or be external to system unit 310. Storage device 380 may be a program storage device used for storage of software to control computer 300, data for use by the computer 300 (including network flow data), or both. Although only a single storage device 380 is illustrated in FIG. 3 for clarity, any number of storage devices 380 may be provided as desired, depending on interface availability in the PCT. The I/O subsystem 340 may be implemented as one or more chips within the system unit 310. In some embodiments, the memory 330 may be connected to the I/O subsystem 340 instead of to the processor 320.

In addition, some embodiments may connect the I/O subsystem 340 to a Trusted Platform Module 350 that provides a cryptoprocessor for storing cryptographic keys to protect information. Embodiments may implement the functionality of the I/O subsystem 340 as one or more separate chips in the system unit 310.

As illustrated in FIG. 3, the I/O subsystem 340 provides hardware resources for the secure trusted environment (TE) 345. The TE 345 provides a secure environment not controlled by the operating system that controls the computer 300. In other embodiments, the TE 345 may be outboard of the I/O subsystem as a separate chipset, or may be incorporated in the processor 320, such as a separate core restricted to TE functionality. The TE 345 contains secure processing functionality that allows performing the secure environment side of the network traffic monitoring techniques described herein in a trusted environment that cannot be interfered with by malware, even malware that may run as a bootkit or rootkit on processor 320. Typically, vendors providing the TE 345 use proprietary or cryptographic techniques to ensure control over what functionality may execute in the TE 345, preventing execution of any but carefully vetted trusted programs to run in the TE 345. Special interfaces may be provided to allow software running on the processor 320 to request the TE 345 to perform desired functionality, such as initiating hardware-protected network traffic monitoring or providing data from the TE 345 to the processor 320 for analysis. The TE 345 may either use its own internal memory or use a portion of the memory 330 for data and firmware storage. Alternatively, instructions in the form of firmware for execution in the TE 345 may be loaded from a non-volatile memory device 345, such as a flash memory, upon powering up of the computer 300, and then loaded into a portion of the memory 330 for execution by the TE 345. In some embodiments, the TE 345 may be disabled and enabled as desired. These instructions may cause the TE 345 to perform network monitoring and other functionality not described herein. The network monitoring firmware may be provided by the secure environment vendor or may be provided by an intrusion detection system vendor and stored as firmware by permission of the secure environment vendor, in conjunction with the provision of operating system environment intrusion detection software. An example of a trusted environment that may be used for these techniques is the Manageability Engine in certain chipsets provided by Intel Corp. Although described herein generally in terms of a hardware-based TE 345, secure environments can be implemented in hardware, firmware, or software, or any combination thereof, as desired.

The computer system 300 may be any time of computing device, such as, for example, a smart phone, smart tablet, personal digital assistant (PDA), mobile Internet device (MID), convertible tablet, notebook computer, desktop computer, server, or smart television. The display 395, if present, may be any time of device for presenting an interface to the user, such as, for example, a touch screen or a liquid crystal display. The elements illustrated in FIG. 3 are illustrative and by way of example only, and elements shown in FIG. 3 may be combined or divided into multiple elements as desired. Other elements, such as geopositioning logic such as a Global Positioning System transceiver, as well as logic for handling mobile communications using standards such as, for example, IEEE 802.11, IEEE 802.16, WiMax, etc., may also be provided as desired.

FIGS. 4-6 are flowcharts illustrating three variations of embodiments of a hybrid operating system and secure environment network traffic monitoring technique. In block 410 of FIG. 4, the TE 345 monitors network traffic, collecting flow data such as is illustrated in chart 200 of FIG. 2. Techniques for monitoring and collecting network traffic data are well known and one of skill in the art would not need additional description to implement network monitoring in the TE 345. The collected network traffic data may be stored in accordance with the NetFlow, IPFIX, or any other desired network traffic monitoring protocol. The collected network traffic data may be stored in the memory 330, on storage device 380, or elsewhere on or outboard of the system unit 310, including transmission from the computer 300 to an external device.

In block 420, an operating system environment intrusion detection system or other software for monitoring network traffic may collect similar network traffic data. The software typically uses the same format and protocols as that used by the TE 345, for ease of comparison of the two data sets, but may use collection and storage techniques that differ from those used in the TE 345 if desired. As with the TE 345 traffic collection, one of skill in the art would not need additional description of network monitoring techniques to implement operating system environment network traffic monitoring and data collection, which techniques are widely known in the art. Although malware may hide data from the operating system environment monitoring, that hiding can be detected in block 430, where the monitored data from both the trusted and operating system environment is compared.

Both the intrusion detection system and the TE 345 may monitor the network traffic continuously or during designated periods. If not monitoring continuously, the network traffic may be monitored for predetermined time periods on a periodic or other basis, upon a request to do so, or until a predetermined amount of network traffic has been recorded. Similarly, the comparison may be performed in various ways, such as periodically, upon request, or upon filling whatever space is allocated for storing the monitored network traffic information.

Differential comparison of data is well known to the art, and need not be further described herein to the person of ordinary skill in the art. In the present situation, the comparison is looking for network traffic data that is present in the trusted environment data, but missing from the operating system environment data. In some situations, instead of simply hiding or filtering out network traffic that is associated with a malware site, the malware may alter the network traffic to make it less suspicious. The malware may modify the source or destination information as appropriate, replacing the correct source or destination address with other innocuous information. The malware may also modify port numbers or protocol type information. In such a scenario, the corresponding data from the trusted environment monitoring will be missing (or will differ) from the operating system environment monitored data, and the operating system environment monitored data will be missing (or will differ) from the trusted environment data. If the monitored data contains timestamps, the comparison may be able to detect the alteration of the data in the operating system environment. In one embodiment, a simple comparison of the two data sets may be sufficient to indicate the presence of malware, and the detailed comparison may be left for later analysis. In any event, the comparison may not only detect the presence of malware, but the identity of the site that is communicating with the computer 110 with hidden communications (in the example of FIG. 1, computer 130).

Implementation of the comparison may provide for the intrusion detection system to request the TE 345 to send the monitor data collected in the secure environment to the intrusion detection system running in the operating system environment. Alternately, the TE 345 may send the second monitor data to the intrusion detection system in the operating system environment without receiving such a request; for example, the TE 345 may periodically send the second monitor data for the comparison.

In block 440, if the trusted environment data is not the same as the operating system environment data, that difference may indicate the presence of malware. An alert may be generated in block 450. The alert may be generated either in the trusted environment or in the operating system environment, and may take any desired form, such as a message displayed on the computer 110, an alert message sent to an external facility (e.g. via a network), or an alert transmitted to the host-based intrusion detection system from the trusted environment. Although referred to here as a message, the content and delivery technique may be any convenient or desired technique. In some embodiments, for example where the comparison of block 430 simply detects a difference in the monitored data without further analysis, the alert may be accompanied with a transmission of the two data sets to an analysis facility, which may be on the computer 110 or elsewhere. If on the computer 110, the analysis facility may be in the TE 345 or the operating system environment. The latter risks possible further manipulation by malware, but may be easier to implement than in the TE 345. The analysis facility may then undertake further analysis of the differences, and possible recognition of malware sites indicated in the trusted environment data.

The analysis facility may receive and compare the two monitor datasets either synchronously (real time or near real time) or asynchronously (for example, on a schedule or periodic basis), or any mixture of the two.

In some embodiments, in block 460, the alert may trigger a response, causing action to be taken responsive to detecting the presence of the malware. The rehabilitative response may take any desired form, including attempting to identify the nature of the malware using other techniques, attempting to rehabilitate the computer 100 by removing the malware, quarantining the computer 100, or attempting to take an action against the external site identified in the hidden traffic, such as computer 130. The nature of those rehabilitative techniques is not described here, except that actions may be taken on the computer 100, on an external system, or both. In embodiments in which a response is taken to the alert, the analysis facility may both do the analysis and take the action, or the analysis facility may only perform the analysis and leave the responsive action to be taken by another facility, which may be in a different location than the analysis facility. The action taken responsive to the alert may also involve communication with and actions by the TE 345.

FIG. 5 is a flowchart illustrating a variant implementation of the technique of FIG. 4. Blocks 510 and 520 correspond to blocks 410 and 420 of FIG. 4. In this variant, as illustrated in block 530, the operating system environment software exports its monitored and collected network traffic data to the trusted environment for comparison in block 540 by a secure program running in the trusted and secure environment with the trusted environment collected network traffic data. Such a variant would prevent a malware from attempting to circumvent detection by manipulating comparison software that runs in the operating system environment. As with the variant of FIG. 4, in block 550 if the comparison indicates the data is the same, the comparison does not indicate the presence of malware based on the network traffic. However, if the monitored network traffic data is not the same, malware may be present. In this variant, in block 560 an exclude list may be consulted to exclude known non-malicious sites that for some reason may appear in the hidden network traffic or other inconsistencies between the data sets that are known not to indicate malware. Although illustrated as excluding the malicious site information after the comparison of the trusted and operating system environment datasets, variants may exclude data on the exclude list prior to the comparison of the two data sets.

Although designated as a list herein, the format of the exclude list is not material, and any desired technique for excluding network traffic from the comparison or the results of the comparison may be used. For example, the exclude list may include rules for excluding network traffic.

In the variant of FIG. 5, the alert resulting from the comparison of the trusted data and the untrusted operating system environment data may be generated by the firmware of the TE 345. In other variants, as explained above, the alert may be generated by the operating system environment or an external facility.

FIG. 6 is a flowchart of another variant of the techniques described above. In this variant, as in the variants illustrated in FIGS. 4 and 5, network traffic is monitored in blocks 610 and 620 in both the TE 345 and the operating system environment. In this variant, instead of performing the comparison on the computer 110, the monitor data from both the TE 345 and the operating system environment is transmitted in block 630 to an external facility. In block 640, the external facility may compare the network traffic data. If block 650, if the network traffic data is the same from both environments, then no malware affecting network traffic is detected. If the datasets are not the same, in block 660, an exclude list may be used to exclude differences that are known to be legitimate. If differences remain, then optionally in block 670 the computer 110 may be quarantined (for example by blocking all of its network communications), to allow further analysis of the computer to try to locate and remove the malware that is affecting the monitoring of network traffic.

By the simple expedient of comparing a trusted record of network traffic created by a secure environment with a potentially malware-corrupted record of network traffic created in an operating system environment, valuable information may be obtained to allow detection of malware such as bootkits or rootkits that may hide malware-related network traffic from intrusion detection systems running in an operating system environment. The comparison may be synchronous or asynchronous, and may involve sending data to external facilities for analysis. While no security technique is likely to prevent or even detect all security problems, this technique is a valuable tool for dealing with covert persistent malware that would not be feasible with software-only tools running in an operating system environment.

The following examples pertain to further embodiments.

Example 1 is a non-transitory computer readable medium with instructions stored thereon, the instructions comprising instructions that when executed cause a computer system to: monitor network traffic of the computer system in an environment controlled by an operating system of the computer system, producing a first monitor data; monitor network traffic of the computer system in a secure environment not controlled by the operating system, producing a second monitor data; compare the first monitor data with the second monitor data; and indicate whether the first monitor data is the same as the second monitor data.

Example 2 includes the subject matter of example 1, wherein the instructions that when executed cause the computer system to compare the first monitor data with the second monitor data comprise instructions that when executed cause the computer system to: send the first monitor data from the environment controlled by the operating system to the secure environment; and compare the first monitor data with the second monitor data in the secure environment.

Example 3 includes the subject matter of example 1, wherein the instructions that when executed cause the computer system to compare the first monitor data with the second monitor data comprise instructions that when executed cause the computer system to: send the second monitor data from the secure environment to the environment controlled by the operating system; and compare the first monitor data with the second monitor data in the environment controlled by the operating system.

Example 4 includes the subject matter of example 1, wherein the instructions that when executed cause the computer system to compare the first monitor data with the second monitor data comprise instructions that when executed cause the computer system to: send the first monitor data and the second monitor data to an external facility; and compare the first monitor data with the second monitor data in the external facility.

Example 5 includes the subject matter of examples 1-4, wherein the instructions stored thereon further comprise instructions that when executed cause the computer system to:

generate an alert indicating the presence of malware on the computer system.

Example 6 includes the subject matter of examples 1-4, wherein the instructions that when executed cause the computer system to compare the first monitor data with the second monitor data comprise instructions that when executed cause the computer system to:

limit the comparison by an exclude list.

Example 7 includes the subject matter of example 1, wherein the instructions stored thereon further comprise instructions that when executed cause the computer system to generate a malware alert in the operating system environment or the secure environment.

Example 8 includes the subject matter of example 7, wherein the instructions that when executed cause the computer system to generate a malware alert in the operating system environment or the secure environment comprise instructions for sending the malware alert via a network.

Example 9 includes the subject matter of example 1, wherein the instructions stored thereon further comprise instructions that when executed cause the computer system to: quarantine the computer system.

Example 10 is a method of detecting malware, comprising: monitoring network traffic of a computer system in an environment controlled by an operating system for the computer system, producing a first monitor data; monitoring network traffic of the computer system in an secure environment not controlled by the operating system, producing a second monitor data; comparing the first monitor data with the second monitor data; and indicating the presence of malware if the first monitor data does not match the second monitor data.

Example 11 includes the subject matter of example 10, wherein monitoring network traffic of a computer system in an environment controlled by an operating system for the computer system comprises:

monitoring network traffic in an intrusion detection system executing under control by the operating system.

Example 12 includes the subject matter of example 10, further comprising: loading firmware for execution in the secure environment at powerup of the computer system.

Example 13 includes the subject matter of any of examples 10-12, wherein comparing the first monitor data with the second monitor data comprises: sending the first monitor data to the secure environment; and comparing the first monitor data with the second monitor data in the secure environment.

Example 14 includes the subject matter of any of examples 10-12, further comprising: quarantining the computer system responsive to the indication of the presence of malware.

Example 15 includes the subject matter of example 10-12, wherein comparing the first monitor data with the second monitor data comprises: sending the second monitor data to the intrusion detection system executing under control by the operating system; and comparing the first monitor data with the second monitor data by the intrusion detection system.

Example 16 includes the subject matter of example 10-12, wherein comparing the first monitor data with the second monitor data comprises: sending the first monitor data from the secure environment to an external facility for comparison with the second monitor data; and sending the second monitor data from the intrusion detection system to the external facility for comparison with the first monitor data.

Example 17 includes the subject matter of example 16, wherein indicating the presence of malware comprises: receiving an alert generated by the external facility.

Example 18 includes the subject matter of example 10, wherein indicating the presence of malware comprises: displaying an alert indicating the presence of malware.

Example 19 includes the subject matter of example 10, wherein the first monitor data and the second monitor data comprise network flow data.

Example 20 is a computer system, comprising: a processor; an operating system, comprising instructions that when executed by the processor control the processor and provide an operating system environment for other software to execute on the processor; an intrusion detection software, comprising instructions that when executed by the processor in the operating system environment cause the processor to: record network traffic of the computer system as a first monitor data; and a secure hardware trusted environment configured to record network traffic of the computer system as a second monitor data, wherein the secure hardware trusted environment is outside of the operating system environment; wherein the computer system is configured to: compare the first monitor data with the second monitor data; and generate an alert if the first monitor data is not the same as the second monitor data.

Example 21 includes the subject matter of example 20, wherein the first monitor data and the second monitor data comprise network flow data.

Example 22 includes the subject matter of example 20, wherein intrusion detection system further comprises instructions that when executed by the processor in the operating system environment cause the processor to: request the second monitor data from the secure environment; and compare the first monitor data with the second monitor data by the intrusion detection system in the operating system environment.

Example 23 includes the subject matter of example 20, wherein the intrusion detection software is configured to cause the process to record network traffic continuously.

Example 24 includes the subject matter of example 20, wherein the computer system is configured to compare the first monitor data and the second monitor data periodically.

Example 25 is a computer system comprising: means for performing the method of any one of examples 10-19.

Example 26 is a computer system, comprising: a processor; an operating system, comprising instructions that when executed by the processor control the processor and provide an operating system environment for other software to execute on the processor; a secure trusted environment; a memory, coupled to the processor and the secure trusted environment, on which are stored instructions that when executed cause the computer system to: monitor network traffic of the computer system in an environment controlled by an operating system of the computer system, producing a first monitor data; monitor network traffic of the computer system in a secure environment not controlled by the operating system, producing a second monitor data; compare the first monitor data with the second monitor data; and indicate whether the first monitor data is the same as the second monitor data.

Example 27 includes the subject matter of example 26, wherein the instructions that when executed cause the computer system to compare the first monitor data with the second monitor data comprise instructions that when executed cause the computer system to: send the first monitor data from the environment controlled by the operating system to the secure environment; and compare the first monitor data with the second monitor data in the secure environment.

Example 28 includes the subject matter of example 26, wherein the instructions that when executed cause the computer system to compare the first monitor data with the second monitor data comprise instructions that when executed cause the computer system to: send the second monitor data from the secure environment to the environment controlled by the operating system; compare the first monitor data with the second monitor data in the environment controlled by the operating system.

Example 29 includes the subject matter of example 26, wherein the instructions that when executed cause the computer system to compare the first monitor data with the second monitor data comprise instructions that when executed cause the computer system to: send the first monitor data and the second monitor data to an external facility; and compare the first monitor data with the second monitor data in the external facility.

Example 30 includes the subject matter of any of examples 26-29, wherein the instructions further comprise instructions that when executed cause the computer system to: generate an alert indicating the presence of malware on the computer system.

Example 31 includes the subject matter of examples 26-29, wherein the instructions that when executed cause the computer system to compare the first monitor data with the second monitor data comprise instructions that when executed cause the computer system to: limit the comparison by an exclude list.

Example 32 includes the subject matter of example 26, wherein the instructions further comprise instructions that when executed cause the computer system to generate a malware alert in the operating system environment or the secure environment.

Example 33 includes the subject matter of example 32, wherein the instructions that when executed cause the computer system to generate a malware alert in the operating system environment or the secure environment comprise instructions for sending the malware alert via a network.

Example 34 includes the subject matter of example 26, wherein the instructions further comprise instructions that when executed cause the computer system to: quarantine the computer system.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium with instructions stored thereon, the instructions comprising instructions that when executed cause a programmable device to:
    monitor network traffic of the programmable device by a processor controlled by an operating system of the programmable device, producing a first monitor data;
    monitor network traffic of the programmable device by trusted hardware of the programmable device other than the processor, wherein the trusted hardware is not controlled by the operating system, producing a second monitor data;
    compare the first monitor data with the second monitor data; and
    indicate whether the first monitor data is the same as the second monitor data.

2. The non-transitory computer readable medium of claim 1, wherein the instructions that when executed cause the programmable device to compare the first monitor data with the second monitor data comprise instructions that when executed cause the programmable device to:
    send the first monitor data from the processor controlled by the operating system to the trusted hardware; and
    compare the first monitor data with the second monitor data by the trusted hardware.

3. The non-transitory computer readable medium of claim 1, wherein the instructions that when executed cause the programmable device to compare the first monitor data with the second monitor data comprise instructions that when executed cause the programmable device to:
    send the second monitor data from the trusted hardware to the processor controlled by the operating system; and
    compare the first monitor data with the second monitor data in the processor controlled by the operating system.

4. The non-transitory computer readable medium of claim 1, wherein the instructions that when executed cause the programmable device to compare the first monitor data with the second monitor data comprise instructions that when executed cause the programmable device to:
    send the first monitor data and the second monitor data to an external facility; and
    compare the first monitor data with the second monitor data in the external facility.

5. The non-transitory computer readable medium of claim 1, wherein the instructions stored thereon further comprise instructions that when executed cause the programmable device to:

generate an alert indicating the presence of malware on the programmable device.

6. The non-transitory computer readable medium of claim 1, wherein the instructions that when executed cause the programmable device to compare the first monitor data with the second monitor data comprise instructions that when executed cause the programmable device to:

limit the comparison by an exclude list.

7. The non-transitory computer readable medium of claim 1, wherein the instructions stored thereon further comprise instructions that when executed cause the programmable device to generate a malware alert by the processor or the trusted hardware.

8. The non-transitory computer readable medium of claim 7, wherein the instructions that when executed cause the programmable device to generate a malware alert by the processor or the trusted hardware comprise instructions for sending the malware alert via a network.

9. The non-transitory computer readable medium of claim 1, wherein the instructions stored thereon further comprise instructions that when executed cause the programmable device to:

quarantine the programmable device.

10. A method of detecting malware, comprising:

monitoring network traffic of a programmable device by a processor controlled by an operating system for the programmable device, producing a first monitor data;

monitoring network traffic of the programmable device by a trusted hardware of the programmable device other than the processor, wherein the trusted hardware is not controlled by the operating system, producing a second monitor data;

comparing the first monitor data with the second monitor data; and indicating the presence of malware if the first monitor data does not match the second monitor data.

11. The method of claim 10, wherein monitoring network traffic of a programmable device by the processor controlled by an operating system for the programmable device comprises:

monitoring network traffic in an intrusion detection system executing under control by the operating system.

12. The method of claim 10, further comprising:

loading firmware for execution in the trusted hardware at powerup of the programmable device.

13. The method of claim 10, wherein comparing the first monitor data with the second monitor data comprises:

sending the first monitor data to the trusted hardware; and comparing the first monitor data with the second monitor data by the trusted hardware.

14. The method of claim 10, further comprising:

quarantining the programmable device responsive to the indication of the presence of malware.

15. The method of claim 10, wherein comparing the first monitor data with the second monitor data comprises:

sending the second monitor data to an intrusion detection system executing under control by the operating system; and comparing the first monitor data with the second monitor data by the intrusion detection system.

16. The method of claim 10, wherein comparing the first monitor data with the second monitor data comprises:

sending the first monitor data from the trusted hardware to an external facility for comparison with the second monitor data; and sending the second monitor data from an intrusion detection system to the external facility for comparison with the first monitor data.

17. The method of claim 16, wherein indicating the presence of malware comprises:

receiving an alert generated by the external facility.

18. The method of claim 10, wherein indicating the presence of malware comprises:

displaying an alert indicating the presence of malware.

19. The method of claim 10, wherein the first monitor data and the second monitor data comprise network flow data.

20. A programmable device, comprising:

a processor;

an operating system, comprising instructions that when executed by the processor control the processor and provide an operating system environment for other software to execute on the processor;

an intrusion detection software, comprising instructions that when executed by the processor in the operating system environment cause the processor to:

record network traffic of the programmable device as a first monitor data; and a trusted hardware configured to record network traffic of the programmable device as a second monitor data, wherein the trusted hardware is not controlled by the operating system;

wherein the programmable device is configured to:

compare the first monitor data with the second monitor data; and generate an alert if the first monitor data is not the same as the second monitor data.

21. The programmable device of claim 20, wherein the first monitor data and the second monitor data comprise network flow data.

22. The programmable device of claim 20, wherein intrusion detection system further comprises instructions that when executed by the processor in the operating system environment cause the processor to:

request the second monitor data from the trusted hardware; and compare the first monitor data with the second monitor data by the intrusion detection system in the operating system environment.

23. The programmable device of claim 20, wherein the intrusion detection software is configured to cause the processor to record network traffic continuously.

24. The programmable device of claim 20, wherein the programmable device is configured to compare the first monitor data and the second monitor data periodically.

* * * * *